United States Patent
Lee

(10) Patent No.: US 8,629,894 B2
(45) Date of Patent: Jan. 14, 2014

(54) APPARATUS AND METHOD FOR AUTOMATICALLY TRANSMITTING EMOTICON DURING VIDEO COMMUNICATION IN MOBILE COMMUNICATION TERMINAL

(75) Inventor: Hui-Jae Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 611 days.

(21) Appl. No.: 12/706,797

(22) Filed: Feb. 17, 2010

(65) Prior Publication Data

US 2010/0208031 A1    Aug. 19, 2010

(30) Foreign Application Priority Data

Feb. 17, 2009  (KR) .................. 10-2009-0012703

(51) Int. Cl.
    *H04N 7/14*  (2006.01)

(52) U.S. Cl.
    USPC .................. 348/14.02; 348/14.01; 348/14.07; 455/456.3; 455/456.6; 455/457; 455/550.1

(58) Field of Classification Search
    USPC ............. 348/14.01–14.16; 370/259–271, 370/351–357; 455/3.01–3.06, 403–426.2, 455/456.1–466, 550.1–560, 575.1–575.9, 455/90.1–90.3; 709/201–207, 217–248; 340/901–905, 933–944, 969, 978, 340/995.1–996, 431–437, 669–671
    See application file for complete search history.

(56) References Cited

U.S. PATENT DOCUMENTS

| | | | |
|---|---|---|---|
| 6,697,103 B1* | 2/2004 | Fernandez et al. | 348/143 |
| 7,310,534 B2* | 12/2007 | Northcutt | 455/456.6 |
| 7,421,477 B2* | 9/2008 | Pettinato | 709/207 |
| 7,466,992 B1* | 12/2008 | Fujisaki | 455/556.1 |
| 7,907,638 B2* | 3/2011 | Norhammar et al. | 370/493 |
| 8,139,725 B2* | 3/2012 | Cohen et al. | 379/88.14 |
| 2002/0075282 A1* | 6/2002 | Vetterli et al. | 345/632 |
| 2005/0277421 A1* | 12/2005 | Ng | 455/445 |
| 2006/0041632 A1* | 2/2006 | Shah et al. | 709/217 |
| 2007/0139516 A1* | 6/2007 | Lee et al. | 348/14.02 |
| 2008/0122796 A1* | 5/2008 | Jobs et al. | 345/173 |

* cited by examiner

*Primary Examiner* — Hemant Patel
(74) *Attorney, Agent, or Firm* — Cha & Reiter, LLC

(57) ABSTRACT

An apparatus and a method for automatically transmitting an emoticon during video communication in a mobile communication terminal are provided. In operation, location information is received during video communication, and data corresponding to the received location information is searched for from a memory. Image data captured by a camera and the searched data are synthesized and transmitted to a counterpart terminal.

12 Claims, 3 Drawing Sheets

APPARATUS AND METHOD FOR AUTOMATICALLY TRANSMITTING EMOTICON DURING VIDEO COMMUNICATION IN MOBILE COMMUNICATION TERMINAL

CLAIM OF PRIORITY

This application claims the benefit of an earlier Korean patent application filed in the Korean Intellectual Property Office on Feb. 17, 2009 and assigned Serial No. 10-2009-0012703, the entire disclosure of which is hereby incorporated by reference.

BACKGROUND OF THE INVENTION

1. Field of the Invention

The present invention relates to an apparatus and a method for automatically transmitting an emoticon during video communication. More particularly, the present invention relates to an apparatus and a method for automatically transmitting an emoticon to a counterpart terminal using Global Positioning System (GPS) during video communication mode.

2. Description of the Related Art

A $3^{rd}$ generation International Mobile Telecommunications (IMT)-2000 system provides a worldwide wireless communication network to enable users to perform wireless communication all over the globe using a terminal. The IMT-2000 system provides not only a voice communication service but also an Internet service and a video communication service. Therefore, the IMT-2000 system has been suggested as a video communication system for performing video communication with a counterpart using a terminal with a camera function. The system includes a Wideband Code Division Multiple Access (WCDMA) and an EVolution Data Optimized (EVDO) system.

In the video communication system, a terminal can captures a user's figure using a camera, compresses the captured image, and transfers the same to a counterpart terminal. In response, the counterpart terminal recovers the compressed image back to an original image, and displays the recovered image on a display unit. Accordingly, the users of two terminals can communicate with each other while directly viewing each other. Additionally, to enhance a visual effect, a terminal is equipped to transmit various emotions along with the image captured by a camera. To this end, a user searches for and selects an emoticon to be transmitted from a preset menu through key manipulation during video communication mode.

However, there is a drawback in inserting an emotion related icon or message for transmission as a user has an inconvenience of having to select and transmit a desired emotion through multiple key manipulation each time. In addition, the required key interaction can interfere with the video communication operation.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for automatically transmitting an emoticon to a counterpart terminal during video communication in a mobile communication terminal.

Another aspect of the present invention is to provide an apparatus and a method for automatically transmitting an emoticon to a counterpart terminal using GPS information during video communication in a mobile communication terminal.

Still another aspect of the present invention is to provide an apparatus and a method for receiving GPS information from GPS satellites; searching for an emoticon, a background image, and a sound effect corresponding to the received GPS information; synthesizing the searched emoticon, background image, sound effect, and a captured image data; and transmitting the same to a counterpart terminal during video communication in a mobile communication terminal.

In accordance with an aspect of the present invention, a method for transmitting image data during video communication in a mobile terminal is provided. The method includes receiving location information during video communication, searching for data corresponding to the received location information from a memory, and synthesizing image data captured by a camera and the searched data for transmission to a counterpart terminal.

In accordance with an aspect of the present invention, a method for transmitting data during a video communication mode in a mobile terminal includes receiving a Global Positioning System (GPS) information during the video communication mode; retrieving data corresponding to the GPS information from a memory; and synthesizing image data captured by a camera and the retrieved data for transmission to a counterpart terminal, wherein the GPS information comprises a speed of the mobile terminal and location information of the mobile terminal, and the retrieved data comprises at any combination of a background image, an emoticon, and a sound effect that correspond with the received GPS information.

In accordance with another aspect of the present invention, a mobile terminal for transmitting image data during video communication is provided. The mobile terminal includes a memory for storing data corresponding to location information, a receiver for receiving location information during video communication, and a synthesizer for searching for the data corresponding to the location information from the memory, synthesizing image data captured by a camera and the searched data, and generating a final image data for transmission.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. For simplicity and to avoid redundancy, descriptions of well-known functions and constructions are omitted for clarity and conciseness.

Figure 1:
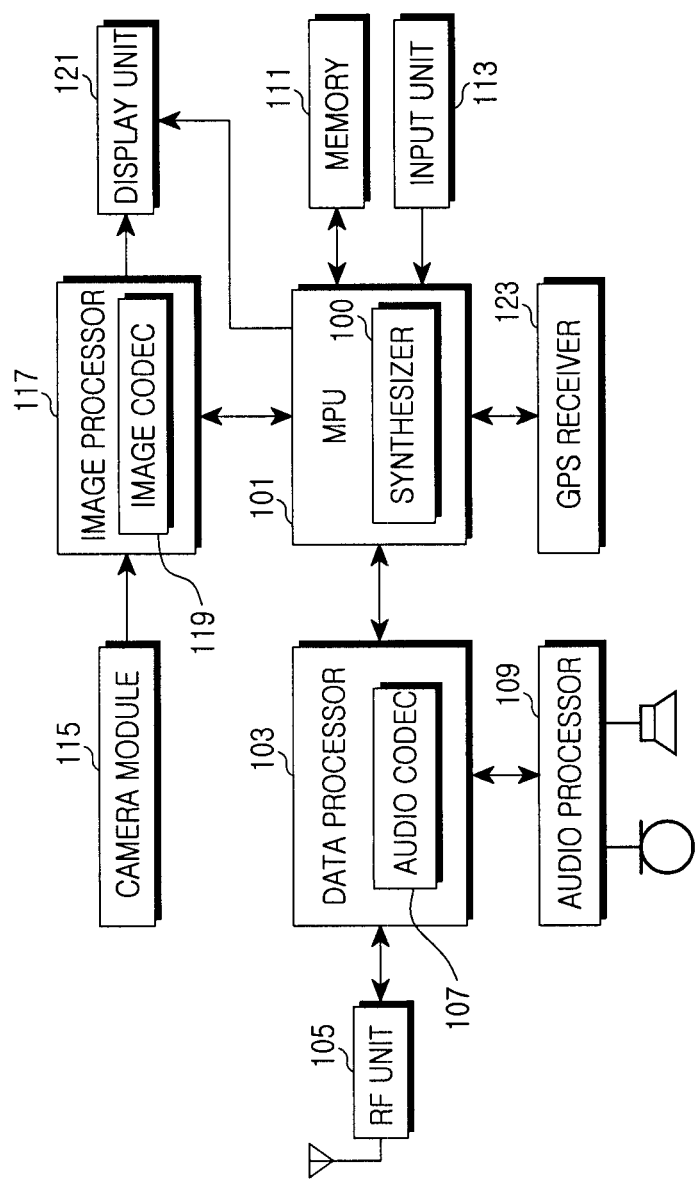
FIG. 1 is a block diagram illustrating a mobile communication terminal according to an exemplary embodiment of the present invention.

FIG. 1 is a block diagram illustrating a mobile communication terminal according to an exemplary embodiment of the present invention.

Referring to FIG. 1, the mobile communication terminal includes a Micro-Processor Unit (MPU) 101, a data processor 103, a Radio Frequency (RF) unit 105, an audio processor 109, a memory 111, an input unit 113, a camera module 115, an image processor 117, a display unit 121, and a GPS receiver 123. Here, the MPU 101 may include a synthesizer 100. The data processor 103 may include an audio codec 107. The image processor 117 may include an image codec 119.

In operation, the MPU 101 controls an overall operation of the mobile communication terminal, such as voice and data communication. In addition to the general functions, the MPU 101 receives GPS information from GPS satellites, searches for an emoticon, a background image, and a sound effect corresponding to the received GPS information, then synthesizes the searched emoticon, background image, and sound effect, MPU 101 further synthesizes image data captured by a user for transmission. Finally, the MPU 101 automatically transmits the processed information to a counterpart terminal during video communication. Here, the GPS information may include location information and velocity information indicative of traveling speed of a user. For this purpose, the MPU 101 includes the synthesizer 100. The synthesizer 100 receives GPS information from the GPS receiver 123, and searches for an emoticon, a background image, and a sound effect corresponding to the received GPS information from the memory 111 during video communication mode. In addition, the synthesizer 100 synthesizes image data captured by a user which is provided from the image processor 117, and the synthesized image data as well as the searched emoticon, background image, and sound effect to generate final image data to be transmitted to a counterpart terminal.

In addition, the RF unit 105 includes an RF transmitter for up-converting a frequency of a signal to be transmitted and amplifying the signal to be transmitted, and an RF receiver for low-noise amplifying a received signal and down-converting a frequency of the received signal. The data processor 103 includes a transmitter for modulating and encoding a signal to be transmitted, and a receiver for demodulating and decoding a received signal. That is, the data processor 103 may include a modem and a codec (coder-decoder). Here, the codec includes a data codec for processing packet data and an audio codec 107 for processing an audio signal such as voice. The audio processor 109 reproduces a reception audio signal output from the audio codec 107 of the data processor 103 via a speaker, or provides a transmission audio signal generated from a microphone to the audio codec 107 of the data processor 103.

The memory 111 stores microcodes of programs for processes and controls of the MPU 101 and various reference data. More particularly, the memory 111 stores a program for receiving GPS information from GPS satellites, searching for an emoticon, a background image, and a sound effect corresponding to the received GPS information, for synthesizing the searched emoticon, background image, sound effect, and image data captured by a user, and for automatically transmitting the synthesized image data along with the searched data to a counterpart terminal during video communication mode. In addition, the memory 111 stores temporary data generated while various programs are executed, and also stores a mapping table for the emoticon, the background image, and the sound effect corresponding to the GPS information according to an exemplary embodiment of the present invention. That is, the memory 111 pre-stores a set of data or a look mapping up data that matches various GPS information retrieved therein. For example, a background image representing 'Mt. Halla' may be stored to correspond to location information representing an island. An emoticon representing 'in driving' or 'on a walk' may be prestored to correspond to different velocity information retrieved from the received GPS information. The mapping table may be directly input and stored by a user, or stored in advance at the manufacturing stage as default values.

The input unit 113 includes a plurality of function keys such as numerical key buttons of 0 to 9, a menu button, a cancel (delete) button, an OK button, a TALK button, an END button, a shooting button, an Internet access button, navigation key (or direction key) buttons ▲/▼/◄/►, etc. The input unit 113 provides key input data corresponding to a key pressed by a user to the MPU 101. The display unit 121 displays status information generated during an operation of the mobile communication terminal, a limited number of letters, a large amount of moving images and still images, etc. The display unit 121 may be a color Liquid Crystal Display (LCD).

The camera module 115 includes a camera sensor for converting a light signal detected while an image is captured into an electrical signal, and a signal processor for converting an analog image signal captured by the camera sensor into digital image data. Here, the camera sensor may be a Charged Coupled Device (CCD), and the signal processor may be a Digital Signal Processor (DSP).

The image processor 117 generates screen data for displaying image data output from the camera module 115. The image processor 117 processes image data output from the camera module 115 on a frame basis, and outputs the image data processed on a frame basis so that the image data is suitable for a characteristic and a size of the display unit 121. In addition, the image processor 117 includes an image codec 119. The image codec 119 encodes image data according to a predetermined scheme, or decodes coded image data to restore original image data.

The GPS receiver 123 receives GPS information, that is, location information and velocity information indicative of the traveling speed of a user from GPS satellites. More particularly, the GPS receiver 123 is driven when video communication is established, receives GPS information from GPS satellites while the video communication is on, and provides the received GPS information to the synthesizer 100 of the MPU 101 according to an exemplary embodiment of the present invention.

Figure 2:
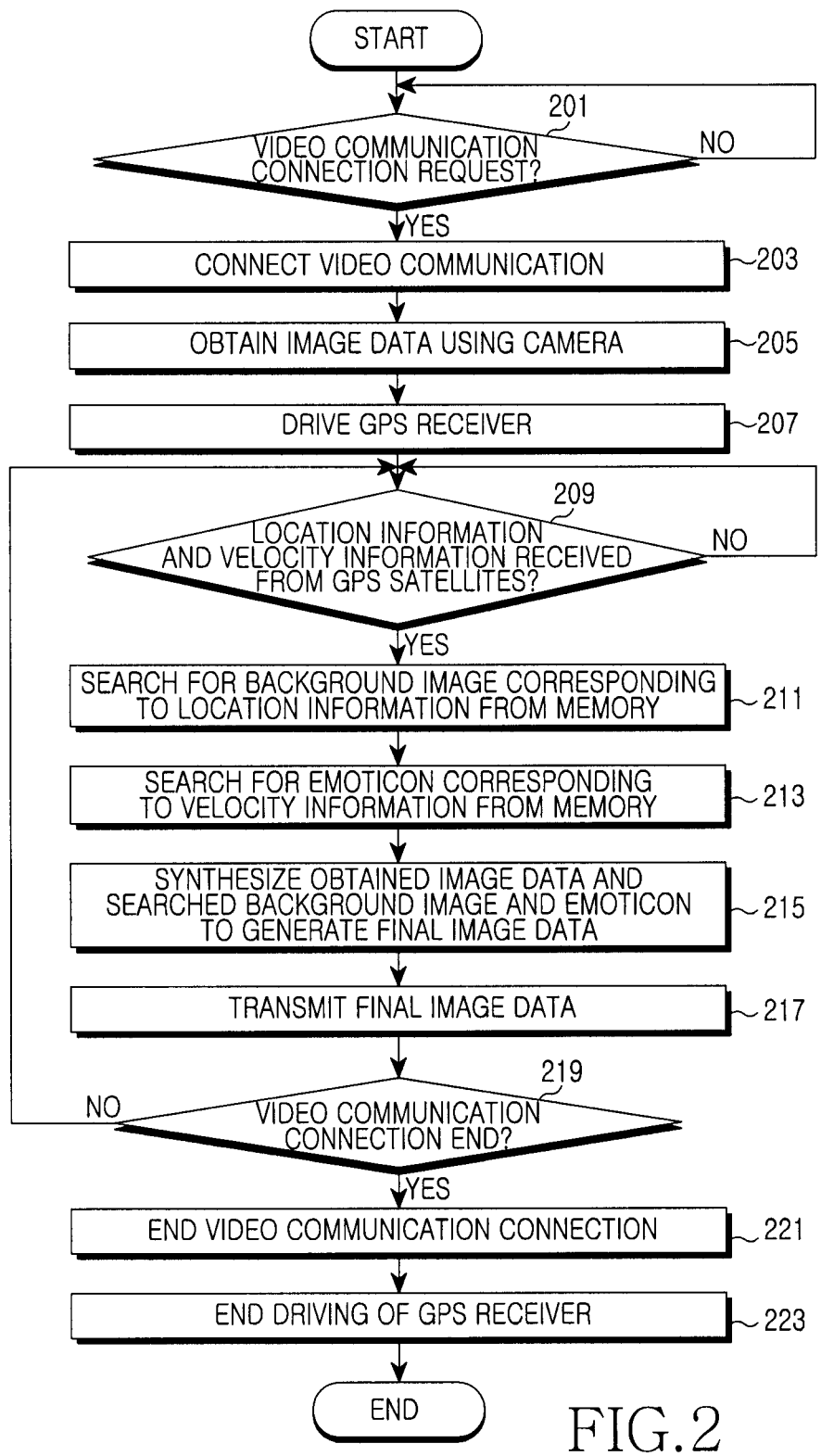
FIG. 2 is a flowchart illustrating a method for automatically transmitting an emoticon to a counterpart terminal using GPS information during video communication according to an exemplary embodiment of the present invention.

FIG. 2 is a flowchart illustrating a method for automatically transmitting an emoticon to a counterpart terminal using GPS information during video communication in a mobile communication terminal according to an exemplary embodiment of the present invention.

Referring to FIG. 2, the terminal determines whether a video communication connection request with a counterpart terminal is detected in step 201. When the video communication connection request is detected in step 201, the terminal connects video communication with the counterpart terminal that has requested a connection in step 203, and a user may capture a desired image data using the camera module in step 205.

The terminal drives a GPS receiver in step 207, and determines whether GPS information, that is, location information and traveling speed of a mobile user are received from GPS satellites using the GPS receiver in step 209.

When the GPS information is received in step 209, the terminal searches for data for synthesis corresponding to the received GPS information from the memory in steps 211 and 213. Here, the data for synthesis denotes data to be synthesized with the image data captured by the camera module and then transmitted to the counterpart terminal. For example, the data for synthesis may include a background image, an emoticon, a sound effect, etc., or any combination thereof. Exemplary embodiments of the present invention will be described using an example where a background image and an emoticon are used as the data for synthesis, but various other data combination may be used as the data for synthesis.

The terminal searches for a background image corresponding to the received location information from the memory in step 211, and searches for an emoticon corresponding to the received velocity information from the memory in step 213. The memory prestored the background image corresponding to the location information, and the emoticon corresponding to the velocity information. Alternatively, the memory may store a new emoticon corresponding to the location information, and a new background image corresponding to the velocity information in a form of a look up table.

The terminal synthesizes the image data captured by the camera module in step 205, and the background image and the emoticon searched in steps 211 and 213 to generate final image data to be transmitted to the counterpart terminal in step 215. Thereafter, the terminal transmits the generated final image data to the counterpart terminal in step 217.

Finally, the terminal determines whether a video communication connection end request with the counterpart terminal is detected in step 219. When the video communication connection end request is detected in step 219, the terminal ends the video communication connection with the counterpart terminal in step 221, and ends the driving of the GPS receiver in step 223. If the video communication connection end request is not detected in step 219, the terminal returns to step 209 and repeatedly performs subsequent steps.

Figure 3:
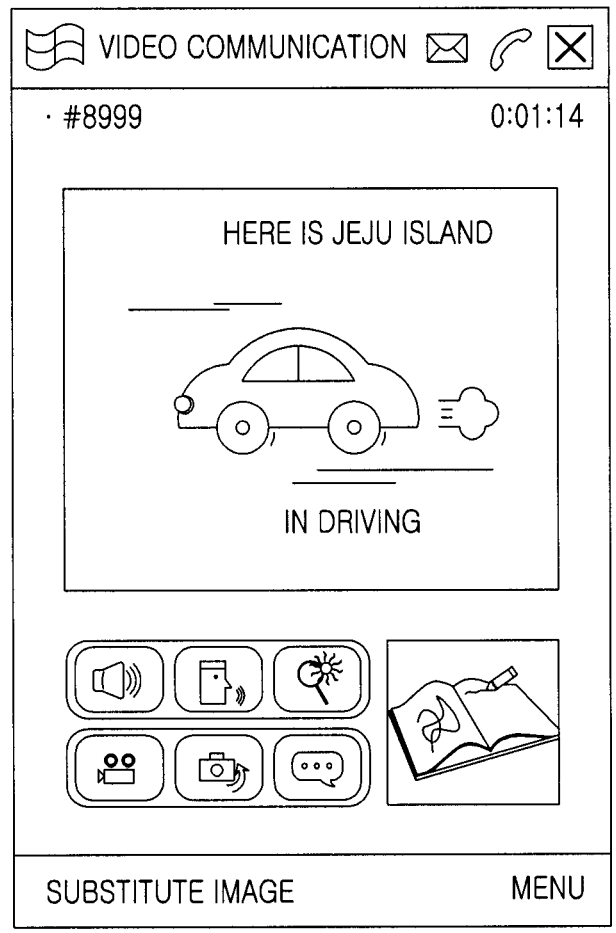
FIG. 3 is an exemplary view illustrating a video communication screen of a counterpart terminal in the case where a mobile communication terminal automatically transmits an emoticon to the counterpart terminal using GPS information during video communication according to an exemplary embodiment of the present invention.

FIG. 3 is an exemplary view illustrating a video communication screen of a counterpart terminal in the case where a mobile communication terminal automatically transmits an emoticon to the counterpart terminal using GPS information during video communication according to an exemplary embodiment of the present invention, Referring to FIG. 3, when a user is located in Jeju island and moves at a velocity greater than a reference value, location information of 'Jeju island' velocity information of the terminal are received from GPS satellites to a user's terminal. In response, the terminal searches for a background image that matches 'Jesu Island', for example 'Mt. Halla', which is stored in advance as a background image corresponding to the location value of 'Jeju island'. The terminal also searches for an emoticon representing 'in driving' state stored in advance that corresponds to the velocity information from the memory. At the same time, the terminal also synthesizes image data captured by a user via the camera module. After retrieval and synthesizing, and the searched background image and emoticon are transmitted along with the synthesized image data to the counterpart terminal.

Upon receiving data, the counterpart terminal may display the received image data on the display unit as illustrated in FIG. 3.As described above, exemplary embodiments of the present invention receive GPS information from GPS satellites, search for an emoticon, a background image, and a sound effect, or any combination thereof, corresponding to the received GPS information, synthesize the searched emoticon, background image, sound effect along with a captured image data, and automatically transmit the synthesized image data and searched data to a counterpart terminal during video communication. As a result of this automation improves a visual effect and a user's inconvenience of having to directly select and transmit a desired emotion through various key manipulation is avoided, thus allowing a user can concentrate on video communication.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof. For example, exemplary embodiments of the present invention are described using using GPS information received from GPS satellites, but it should be noted that location information periodically received from a base station may be used.

What is claimed is:

1. A method for transmitting image data during video communication in a mobile terminal, the method comprising:
   receiving location information during video communication;
   searching for data corresponding to the received location information from a memory; and
   synthesizing image data captured by a camera and the searched data for transmission to a counterpart terminal,
   wherein the data includes an automatically-selected emoticon corresponding to the location information that is transmitted to the counterpart terminal,
   wherein when the mobile terminal is in motion, location information and a speed are used to determine a type of transportation causing the mobile terminal to be in motion, and wherein the automatically-selected emoticon corresponds to an image of the type of transportation causing the mobile terminal to be in motion.

2. The method of claim 1, wherein the data further includes at least one of a background image, and a sound effect.

3. The method of claim 1, wherein the location information comprises Global Positioning System (GPS) information.

4. The method of claim 3, wherein the location information comprises traveling velocity information of the mobile terminal to determine direction.

5. A mobile terminal for transmitting image data during video communication, comprising:
   a memory for storing data corresponding to location information;
   a receiver for receiving the location information during the video communication; and
   a synthesizer for searching for the data corresponding to the location information from the memory, synthesizing image data captured by a camera and the searched data, and generating a final image data for transmission,
   wherein the data includes an automatically-selected emoticon corresponding to the received location information, in which when the mobile terminal is in motion, location information and a speed are used to determine a type of transportation causing the mobile terminal to be in motion, and wherein the automatically-selected emoticon corresponds to an image of the type of transportation causing the mobile terminal to be in motion.

6. The mobile terminal of claim 5, wherein the data further includes at least one of a background image, and a sound effect.

7. The mobile terminal of claim 5, wherein the location information comprises Global Positioning System (GPS) information.

8. The mobile terminal of claim 7, wherein the location information comprises traveling velocity information of the mobile terminal.

9. The mobile terminal of claim 5, further comprising a transmitter for transmitting the generated final image data to a counterpart terminal.

10. A method for transmitting data during a video communication mode in a mobile terminal, the method comprising:
    receiving a Global Positioning System (GPS) information;
    retrieving data corresponding to the GPS information from a memory; and
    synthesizing image data captured by a camera and the retrieved data for transmission to a counterpart terminal,
    wherein the retrieved data includes an automatically-selected emoticon that corresponds to the GPS information in which when the mobile terminal is in motion, the GPS information and a speed are used to determine a type of transportation causing the mobile terminal to be in motion, and wherein the automatically-selected emoticon corresponds to an image of the type of transportation causing the mobile terminal to be in motion.

11. The method of claim 10, wherein the retrieved data comprises at least one of a background image, and a sound effect that correspond with the received GPS information.

12. The method of claim 10, wherein the retrieved data further includes at any combination of a background image, and a sound effect that correspond with the received GPS information.

* * * * *